June 3, 1952   G. A. PRITCHARD   2,599,015
SHIELD FOR AUTOMOBILE WINDOWS
Filed April 12, 1950
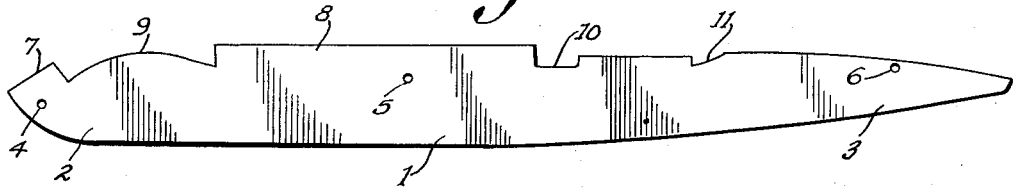
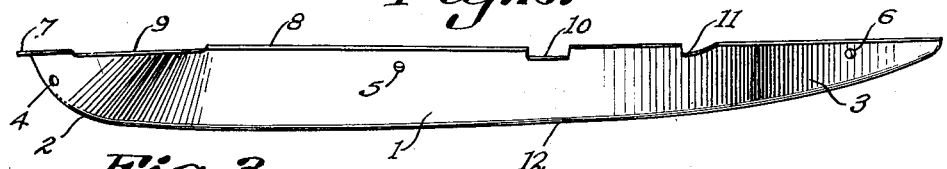
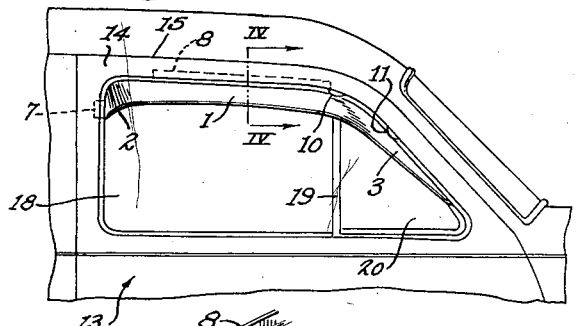
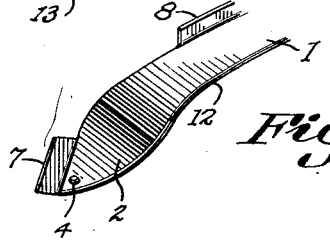
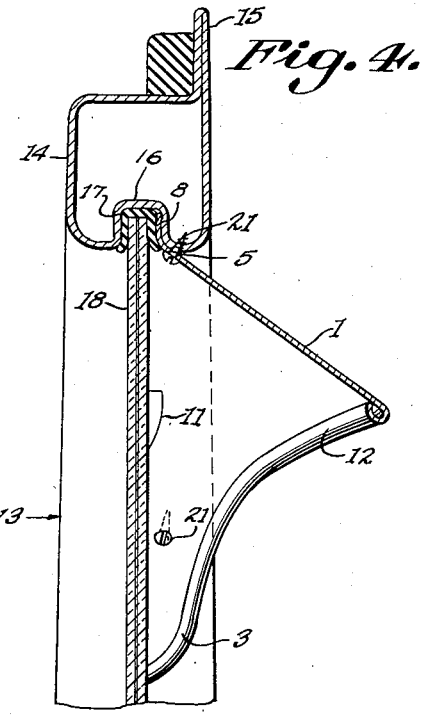
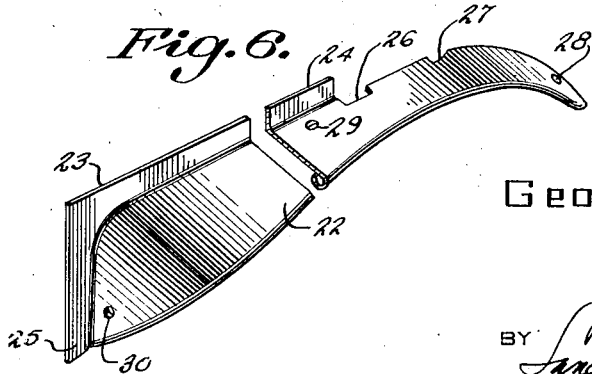
George A. Pritchard
INVENTOR.
BY *Lancaster, Allwin & Rommel*
ATTORNEYS.

Patented June 3, 1952

2,599,015

UNITED STATES PATENT OFFICE 2,599,015

SHIELD FOR AUTOMOBILE WINDOWS

George A. Pritchard, Atlantic Beach, Fla.

Application April 12, 1950, Serial No. 155,418

5 Claims. (Cl. 296—44)

This invention relates to a shield or deflector for mounting upon an automobile door above the window opening as a means for aiding ventilation and providing protection against the elements when the windows are open.

Shields mountable upon automobile bodies for this purpose are fairly common and in general fall into two broad construction groupings, one type being adapted for mounting upon the top edge of the automobile door itself, and the other mounting upon the window casing in a manner to extend along the top portion of the channel in which the window glass is received. The present invention is concerned with the latter category.

Considering shields as heretofore constructed and mounting in or in close proximity to the glass channel, it has been found that the means with which these are normally equipped for fitting into the channel acts to the detriment of shaping of the shield to provide an accurate fit to the particular configuration of the window opening. The streamlined design of the modern automobile has accentuated this problem, by reason of the flowing curved formation of the front edge, top edge, and rear edge of the window opening. Formation of a shield to fit one make of automobile window accurately has, too often, resulted in making the same shield wholly incapable of being fitted into any other make. This increases the cost of manufacture of the shields, by reason of the increased cost obviously attendant upon the necessity of extending operations for manufacture of many shields of different shapes.

One important object of the present invention is, therefore, the provision of a shield having efficient channel-engaging means, but nevertheless specifically designed as to the end portions thereof for easy and swift bending of the end portions to the exact shape of the window opening in which it is being mounted.

Another important object is to provide a shield which will protectively overlie the entire top edge of the window, and which will additionally extend forwardly so as to extend substantially the full length of the front edge of the butterfly-type ventilating flap or visor that is conventional equipment on most present day automobiles.

Still other objects are to provide a shield that will blend easily and attractively with streamlined modern automobile design; will be capable of manufacture at relatively low cost; will be mountable upon an automobile door with ease; and will discharge its deflecting and ventilating functions with full efficiency.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a plan view of the flat blank from which the shield is formed.

Figure 2 is a top plan view of the completed shield.

Figure 3 is a side elevational view of the shield, an automobile door on which said shield is mounted being shown fragmentarily.

Figure 4 is an enlarged section taken substantially on line IV—IV of Figure 3.

Figure 5 is a fragmentary perspective view of the rear end portion of the completed shield.

Figure 6 is a perspective view of a modified form, part being broken away.

Referring to the drawing in detail, a flat blank of resilient non-corrosive sheet metal material is first cut to the shape shown in Figure 1. This piece of material can conveniently be said to include an elongated body 1 integral at opposite ends with the rear end portion 2 and front end portion 3. The front end portion 3 is itself of relatively elongated form and tapers quite gradually along curving lines to a pointed front end.

Formed in said blank is a rear end opening 4, spaced closely from the rear end of the blank. Medially between the opposite ends of the shield is a middle opening 5, and spaced a short distance from the front end of the shield is the front end opening 6. As will be apparent, these openings are adapted to receive screws or like fastening means, whereby the shield is mounted in place above the window opening of an automobile door and the ventilating flap of said door.

As readily seen from Figure 1, the outer edge of the rear end portion 2 curves inwardly toward the inner or door-engaging edge, and merges into a tab or rear end flange 7 which, in the completed shield, is bent outwardly and to the rear so as to engage in the side portion of the window-receiving groove of the door.

The body or medial portion of the shield 1 is also formed with a groove-engaging tab or flange 8, this being of elongated formation and extending a substantial portion of the length of said body. In the completed shield the figure 8 is bent upwardly as readily seen from Figure 3.

The inner edge of the rear end portion, between the tabs 7 and 8, is bowed outwardly as at 9, this curvature being for the purpose of accommodating the shield in its completed form to an automobile window's rear upper corner, that is generally formed with a rather sharply curved appearance (see Figure 3). The bowed or arcuate formation of the inner edge 9 of the rear end portion permits the shield to be curved downwardly at its rear end while yet having said rear end fitted accurately into the corner of the window casing.

At the front end of the flange 8, the inner edge of the shield is provided with a squared notch 10 for fitting of the shield around the dividing post of the automobile window, and located intermediate said notch 10 and the pointed front end of the shield is a small angular notch 11 for fitting of the front end portion of the shield around the pivot shaft or pin on which the swingable ventilating flap is mounted at the front end of the window.

Completing the formation of the shield, the outer edge thereof, from end to end of the shield, is rolled at 12 for the purpose of strengthening the shield construction and also for the purpose of eliminating what otherwise would be a sharp edge capable of producing injury.

An automobile door of streamlined, modern lines is generally designated 13, and is illustrated as a typical example of door and window construction to which the shield is adapted. This door includes the window casing 14, having the vertically extended top edge 15. The window casing has the usual window opening, the sides and top portion of which are formed with the continuous casing groove 16 in which is mounted the channeled felt 17 receiving the top portion of the window glass 18 when the window is run up to closed position.

In the illustrated example of an automobile door, the front vertical edge of the glass 18 runs in a channeled dividing post 19, separating the glass 18 from the swingably mounted glass ventilating flap 20 of the vehicle. All this is conventional and common in practically all present day automobile construction.

Prior to mounting of the shield in the desired location upon the automobile door, it is bent to a suitable shape as shown in Figures 2 to 4, the body 1 being substantially flat, and rear end portion 2 being downcurved rather sharply, and the front end portion 3 being curved downwardly in a long gradual curve conforming to the curvature of the window from the top edge of said window to a location close to the lower front corner, to which location the shield constituting the present invention is adapted to extend, as may be readily noted by reference to Figure 3. This basic curvature of the shield is imparted thereto during the manufacture of the shield. In most instances, the shield would fit accurately the particular make of automobile for which it is intended. However, in some instances the curvature of the shield and window might not match with complete exactness. In such a case, the rear end portion 2 can be bent as necessary to fit the upper rear corner of the particular window within which the shield is to be mounted. This further curvature of the shield during the fitting thereof is readily achieved because there is no stiffening flange or the like to interfere with the shaping operation.

Further, the front end portion 3 of the shield is also adapted for further shaping thereof during the actual fitting because here also, there is no interfering stiffening flange. Meantime, the vertically disposed attaching flanges 7 and 8 fit into the rear side channel and the top channel respectively of the window. As seen from Figure 4, these flanges fit between the outside wall of the channeled felt 17 and the wall of the casing groove 16. The post 19 of the door fits into the notch 10 and the pivot pin of the ventilating flap fits into the angular notch 11.

When the shield has been properly positioned, it is secured fixedly to the window casing by screws 21 extending through the openings 4, 5, 6 of the shield and threaded into the inside edge of the casing in a manner to be effectively concealed.

In Figure 6, there is illustrated a modified form of shield the body and end portions of which are, in general, of the same general shape and curvature of the first form. However, in this modified form, in place of the flanges 7 and 8 there is a single flange 23 integral with the inner edge of the body and rear end portion 22 of the shield and extending vertically upwardly and rearwardly therefrom. This fits into the casing groove extending fully into the upper rear corner thereof. Otherwise, the shield corresponds generally in form and manner of attachment to the door, to the first form and is held in place by screws 21 passing through a plurality of openings spaced longitudinally of the shield as in the first form.

The flange of the modified form is integrally formed with a squared corner portion adapted to fit directly into the corner of the window channel, a horizontally disposed portion 24 extending along the body of the shield, and a vertically extending side portion 25 formed upon the rear end portion of the shield. Formed in the body adjacent the front end of the flange portion 24 is the notch 26 for receiving the division post of the window, and spaced forwardly of this notch is the angular notch 27 for receiving the pivot shaft of the window's butterfly ventilating flap.

Openings 28, 29, and 30, corresponding to the openings of the first form, receive the screws 21 for fixedly securing the shield to the window casing in the same manner as in the first form, that is, the underside of the window casing close to the glass channel, said screws threading into the window casing at an angle for ease in installation.

I claim:

1. A shield for automobile windows comprising a body proportioned to extend along the top edge of the channel of an automobile window casing, front and rear end portions on said body to extend downwardly along opposite side edges of said channel, the inner edge of the rear end portion being bowed outwardly at a location spaced from the rear end of said rear end portion, and said rear end portion at said edge to be disposed closely adjacent the rear upper corner of the window casing means on said body and rear end portion adapted to engage in said channel, there being notches in one edge of the body and front end portion adapted to fit around the division post and pivot shaft of the window, and means for securing said body and end portions to said casing adjacent the channel.

2. A shield for automobile windows comprising a body proportioned to extend along the top edge of the channel of an automobile window casing, front and rear end portions on said body to extend downwardly along opposite side edges of said channel, the inner edge of the rear end portion being bowed outwardly at a location spaced from the rear end of said rear end portion, and said rear end portion at said edge to be disposed closely adjacent the rear upper corner of the window casing, means on said body and rear end portion adapted to engage in said channel, the body having a notch receiving the division post of the window, the front end portion having a notch receiving the pivot shaft of said window, and said body and end portions having openings for fastening elements spaced away from the channel and said bowed inner edge fixedly connecting the shield to portions of the casing adjacent the channel.

3. A shield for automobile windows comprising a body proportioned to extend along the top edge of the channel of an automobile window casing, front and rear end portions on said body to extend downwardly along opposite side edges of said channel, the inner edge of the rear end portion being bowed outwardly at a location spaced from the rear end of said rear end portion, and said rear end portion at said edge to be disposed closely adjacent the rear upper corner of the window casing and means on said body and rear end portion adapted to engage in said channel, said body and end portions having openings for fastening elements spaced away from the channel and said bowed inner edge for fixedly connecting the shield to portions of the casing located adjacent the channel.

4. A shield for automobile windows comprising a body proportioned to extend along the top edge of the channel of an automobile window casing, front and rear end portions on said body to extend downwardly along opposite side edges of said channel, the inner edge of the rear end portion being bowed outwardly at a location spaced from the rear end of said rear end portion, and said rear end portion at said edge to be disposed closely adjacent the rear upper corner of the window casing, a longitudinal flange on said body engaging in said channel, said flange terminating short of said end portions and said outwardly bowed inner edge for free bending of the end portions to the configuration of said channel, a flange on the outer end of the rear end portion spaced a substantial distance from the adjacent end of the first named flange, there being a clear space defined by said outwardly bowed inner edge and the adjacent end edges of said flanges, between the flanges, and means for securing said body and end portions to the casing adjacent said channel.

5. A shield for automobile windows comprising a body proportioned to extend along the top edge of the channel of an automobile window casing, front and rear end portions on said body to extend downwardly along opposite side edges of said channel, the inner edge of the rear end portion being bowed outwardly at a location spaced from the rear end of said rear end portion, and said rear end portion at said edge to be disposed closely adjacent the rear upper corner of the window casing, a longitudinal flange on said body extending substantially the full length of the body and along said bowed edge and terminating short of the front end portion thereof for free bending of the front end portion to the configuration of the channel, means formed in one edge of said body and front end portion for fitting of the shield around the division post and pivot shaft of said window, and means for securing the body and end portions to said casing adjacent the channel.

GEORGE A. PRITCHARD.

REFERENCES CITED

The following references are of record in the file of this patent:

UNITED STATES PATENTS

| Number | Name | Date |
| --- | --- | --- |
| D. 102,974 | Pritchard | Jan. 26, 1937 |
| D. 160,029 | Sprung et al. | Sept. 5, 1950 |
| 2,034,342 | Hay | Mar. 17, 1936 |
| 2,108,322 | Thorp | Feb. 15, 1938 |
| 2,134,054 | Mabey | Oct. 25, 1938 |
| 2,199,134 | Johnson | Apr. 30, 1940 |
| 2,468,439 | Gregorius | Apr. 26, 1949 |
| 2,482,982 | Keier | Sept. 27, 1949 |

OTHER REFERENCES

Periodical: Motor, November 1949 (vol. 92, issue No. 5), page 115, "Auto Ventshade Side Visors."